United States Patent [19]

Furlong

[11] Patent Number: 4,906,985

[45] Date of Patent: Mar. 6, 1990

[54] EASILY UPGRADEABLE VIDEO MEMORY SYSTEM AND METHOD

[75] Inventor: Thomas Furlong, Half Moon Bay, Calif.

[73] Assignee: Digital Equipment Corporation, Maynard, Mass.

[21] Appl. No.: 277,059

[22] Filed: Nov. 28, 1988

[51] Int. Cl.[4] .............................................. H04N 1/46

[52] U.S. Cl. ....................................... 340/799; 358/81

[58] Field of Search ..................... 358/81, 82, 98, 443, 358/444, 447, 467; 340/793, 701, 703, 798, 799

[56] References Cited

U.S. PATENT DOCUMENTS

| | | | |
|---|---|---|---|
| 4,608,596 | 8/1986 | Williams et al. | 358/81 |
| 4,769,632 | 9/1988 | Work et al. | 340/799 |
| 4,837,710 | 6/1989 | Zelinsky et al. | 358/81 |

*Primary Examiner*—James J. Groody
*Assistant Examiner*—Jerome Giant
*Attorney, Agent, or Firm*—Flehr, Hohbach, Test, Albritton & Herbert

[57] ABSTRACT

A video memory system is disclosed in which the memory module used to store video data also generates a selection signal that indicates whether the module is a monochrome or color memory module. Memory control logic generates a pixel clock which governs the rate at which pixels of data are output to a monitor, and a load clock which determines the rate at which data is read from the memory module. The load clock is generated at a first rate when the selection signal denotes a monochrome memory module, and at a second, faster rate when the selection signal denotes a color memory module. A shift register receives video data from the video memory module at the rate of the load clock, and outputs that data at the pixel clock rate. The shift register outputs a plurality of bits of the video data in parallel to a video signal generator, which converts the received data into a video signal. To upgrade the video memory system in the preferred embodiment from a monochrome system to a color system, a monochrome memory module is replaced with a color memory module. Alternatively, an upgrade can be effected by adding memory to the memory module and changing the mode selection signal from monochrome to color mode.

23 Claims, 4 Drawing Sheets

* AFTER 2 PIXEL CLOCK CYCLE DELAY

EASILY UPGRADEABLE VIDEO MEMORY SYSTEM AND METHOD

The present invention relates generally to video memory subsystems for computer systems having video interfaces, and particularly to methods and systems for easily upgrading a monochrome video memory subsystem to handle color video.

BACKGROUND OF THE INVENTION

Most modern computers include video monitor interfaces. A video memory subsystem is the portion of a computer that stores the image shown on the computer's video monitor. Video memory systems are designed to send the stored image data to the monitor at a rate synchronized with the raster scan rate of the monitor.

It is well known that color video memory subsystems are usually substantially more expensive than monochrome memory subsystems. There are two primary bases for the higher cost of color memory subsystems: (1) more memory is required to store color images than monochrome images, and (2) the monochrome memory support circuitry must be replaced with circuitry for supporting a color monitor. The second of these two items is the subject of the present invention.

Most desk top computer systems and workstations which can be used with monochrome monitors have video memory support circuitry that works only with monochrome monitors. To use the computer system with a color monitor, a new video memory subsystem must be added to the computer. In some cases, the monochrome memory subsystem is removed and replaced; in other computers the monochrome memory subsystem is not removable, and therefore the added color memory subsystem must deactivate or override the monochrome subsystem.

The differential in cost between color and monochrome video memory systems is therefore based, in part, on the need to add an additional subsystem on its own printed circuit board to the computer.

The present invention provides a video memory subsystem that works with both monochrome and color monitors, and thereby avoids a large portion of the cost associated with upgrading a monochrome system to a color system. This new video memory subsystem can be used with either a monochrome or color memory module the only difference being the amount of memory in the module, and a mode selection signal which denotes whether the memory module is a monochrome or color module. The video memory subsystem reads the mode selection signal and automatically selects a corresponding mode of operation.

It is therefore a primary object of the present invention to provide a video memory subsystem for both monochrome and color monitors, and to thereby avoid a large portion of the cost associated with upgrading a monochrome system to a color system.

SUMMARY OF THE INVENTION

In summary, the present invention is a video memory subsystem. The memory module used to store video data also generates a mode selection signal that indicates whether the module is a monochrome or color memory module.

Memory control logic generates a pixel clock which governs the rate at which pixels of data are output to a monitor, and a load clock which determines the rate at which data is read from the memory module. The load clock is generated at a first rate when said mode selection signal denotes that the memory module is a monochrome memory module, and at a second, faster rate when said mode selection signal denotes that the memory module is a color memory module.

A shift register receives video data from the video memory module at the rate of the load clock, and outputs that data at the pixel clock rate. The shift register outputs a plurality of bits of the video data in parallel to a video signal generator, which converts the video data into a video signal. The shift register's parallel outputs are staggered so that different data is output from the shift register for a plurality of pixel clock cycles. In color mode, when the mode selection signal denotes a color memory module, all of the parallel outputs are used by the video signal generator to determine the color and hue of the video signal.

In monochrome mode, when the mode selection signal denotes a monochrome memory module, the video signal generator uses only one of the parallel outputs from the shift register to generate the video output signal. In both modes, the shift register is reloaded only after all the video data in the shift register has been converted by the video signal generator. In color mode, however, all of the video data in the shift register is converted into video signals at a much faster rate than in monochrome mode because several bits of data are converted during each pixel clock cycle instead of just one.

In the preferred embodiment, video memory modules contain only video memory chips which are coupled to standard address, data and control lines, and a mode selection line that is set to either 1 (for monochrome mode) or 0 (for color mode). Color memory modules typically contain four to eight times as much memory capacity as monochrome memory modules.

In accordance with the present invention, the same video memory system is used for both color and monochrome video. A mode selection signal generated by the video memory module determines whether the system is in color or monochrome mode. As a result, the video memory system is easily upgraded from monochrome to color. All that is required for the upgrade in the preferred embodiment is to replace a monochrome memory module with a color memory module. Alternatively, an upgrade can be effected by adding memory to the memory module and changing the mode selection signal from monochrome to color mode.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
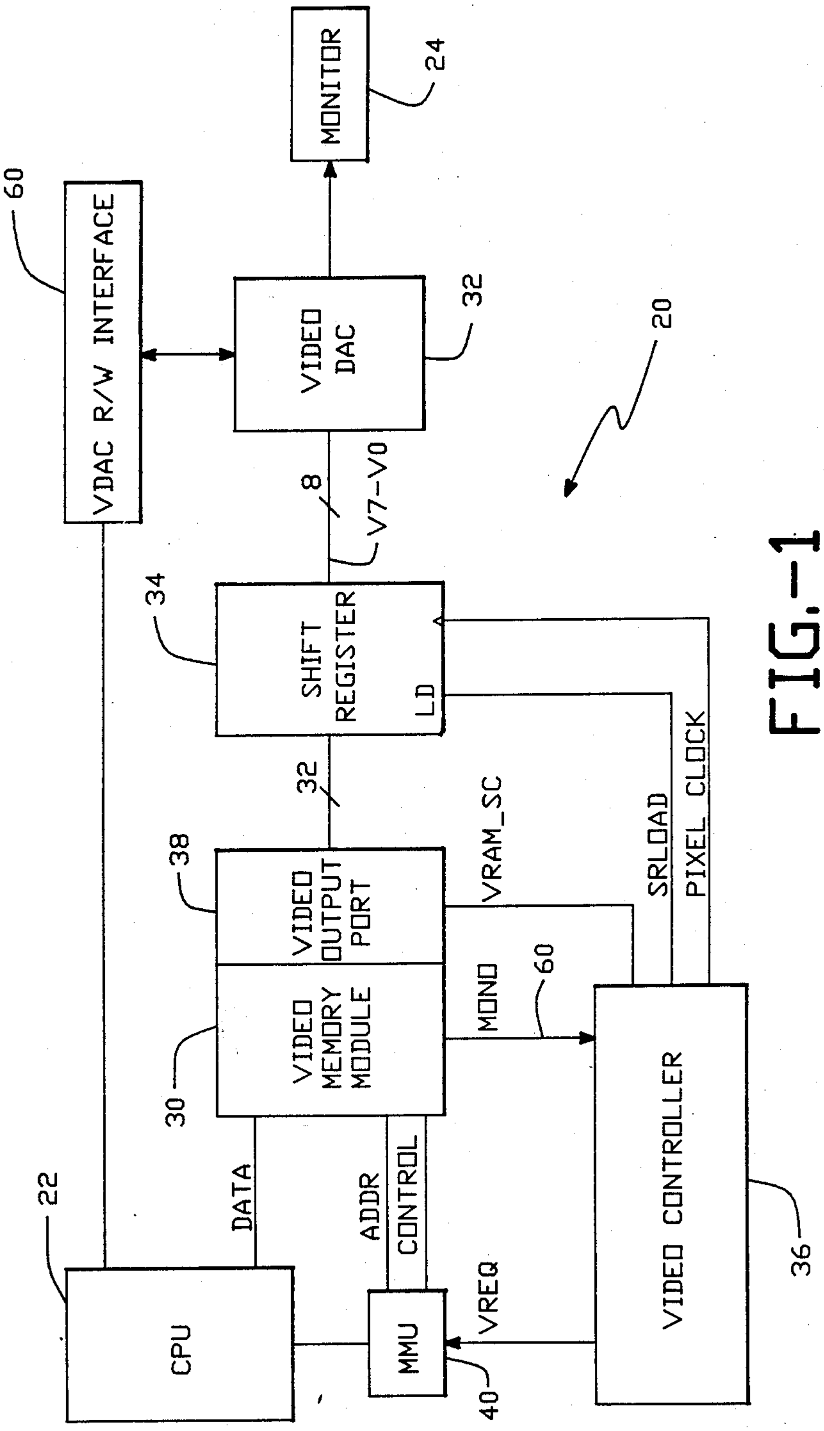
FIG. 1 is a block diagram of a video memory system.

Referring to FIG. 1, there is shown a block diagram of the video subsystem 20 for a computer workstation. The computer's CPU 22 and video monitor 24 are shown, but are not considered to be part of the video subsystem 20.

The primary components of the video subsystem 20 are a video memory module 30, which stores video data, a video digital to analog converter (VDAC) 32 which converts video data into an analog video output signal, and a shift register 34 which serializes the video data being sent from the video memory module 30 to the VDAC 32. A video controller 36, shown in more detail in FIG. 3, controls the flow of data from the video memory module 30 to the VDAC 32.

As is conventional in many computer systems, the memory chips used in the video memory module 30 have a video output port 38, separate from the normal input/output circuitry, for reading video data at a high rate of speed. For those not familiar with the operation of video memory chips, the following is a short explanation of those features which are important o the operation of the preferred embodiment of the invention.

Video Port.

An important feature of the video port 38 is an internal shift register which holds all the video data needed to write one line across the monitor's display. New data is loaded into the internal shift register before each line on the monitor is refreshed. A memory management unit 40 is used to generate or determine the address in memory 30 of the video data for the next video scan line.

In the preferred embodiment, the monitor 24 displays an array of 1024 by 864 pixels, or a total of 1 Meg pixels. The video memory module is arranged so that the internal shift register in the video port 38 stores 1024 pixels of video data (160 pixels of which are not used) i.e., enough data for writing one scan line on the monitor 24.

Many video memory chips present four new bits of data each time the internal shift register is clocked, until all of the data in the internal shift register has been read. However, the exact number of bits presented per clock cycle is not important. Several memory chips can be operated in parallel so that the any specified number of bits can be obtained during each clock cycle. These aspects of the operation of the memory chips in the video memory module 30 are conventional, and have been presented only as background information.

In the preferred embodiment, each cycle of the "shift clock" VRAM__SC causes thirty-two new bits of video data to be output by the video memory module's internal shift register. This video data is then loaded into a thirty-two bit shift register 34, which serializes the data and transmits it to the video DAC 32.

Shift Register.

A clock signal called the Pixel Clock determines the rate at which data is sent to the monitor 24. In particular, one new pixel is generated and sent to the monitor 24 for each Pixel Clock cycle. To accomplish this, the shift register 34 is clocked by the Pixel Clock, causing the data for one pixel to be transmitted to the video DAC 32 once each Pixel Clock cycle.

When the video subsystem 20 is operating in color mode, eight bits of video data V7–V0 are used to generate one pixel. In monochrome mode, only one bit of video data V7 is needed to generate a pixel.

It is important to note that the Pixel Clock operates at the same rate regardless of whether the video subsystem 20 is operating in color mode or monochrome mode. The pixel rate is determined by the scanning rate of the raster scanner in the monitor 24 and that scanning rate is generally the same for both color and monochrome monitors.

Figure 2:
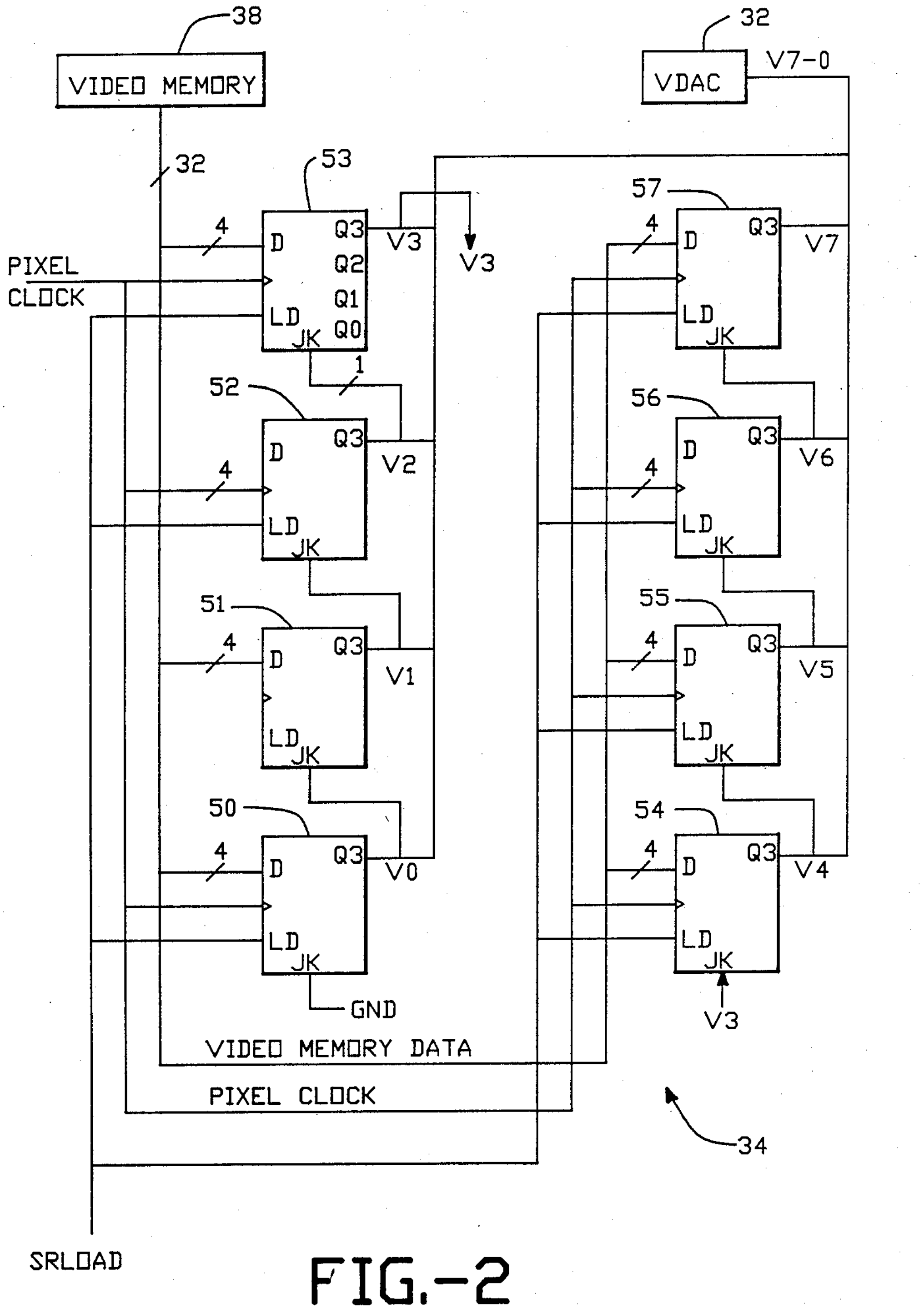
FIG. 2 is a detailed diagram of the shift register used in the video memory system of FIG. 1.

As shown in FIG. 2, eight four-bit shift registers 50–57 are serially connected to form the thirty-two bit shift register 34. The last outputs V7 to V0 from each of the eight shift registers 50–57 are connected to the video DAC 32. Thus the outputs V7 to VO of the shift register 34 are staggered, representing every fourth bit of the data in the thirty-two bit shift register 34.

Each cycle (actually, each upward transition) of the Pixel Clock signal causes the data in the shift registers 50–57 to be shifted by one bit position, thereby presenting eight new bits of video data on lines V7–V0. Thus eight bits of video data V7–V0 are output by the shift register 34 to the video DAC 32 each time that the shift register 34 is clocked. All of the data in the shift registers 50–57 is presented to the video DAC 32 in four clock cycles of the Pixel Clock.

When the video subsystem 20 is in monochrome mode, however, the video DAC 32 is programmed to use only one bit V7 of that data for generating a video signal. Since only the data on line V7 is used, it takes thirty-two Pixel Clock cycles to present all of the data in the shift register 34 to the video DAC 32.

Video DAC.

Referring to FIG. 1, the video DAC 32 is used in the preferred embodiment as follows. Video DACs are programmable devices. The video DAC 32 used in the preferred embodiment contains a table of 256 entries, one entry for each possible value of the eight bits V7–V0. Each of the 256 entries defines the analog video output signal that will be generated when the corresponding value of bits V7–V0 is received. In color video applications, the table in the video DAC 32 is commonly known as a color map, and the table entries in the video DAC 32 define the color and hue that will be displayed by the monitor.

VDAC interface 60 is used to read and write new table entries into the video DAC 32 under the control of the system's CPU 22. Most computers with color video systems, including the preferred embodiment, have software which allows the user to specify or select the colors that will be associated with each of the possible values of V7–V0, and to implement those selections by loading new values into the video DAC's color map.

In monochrome video applications the table entries in the video DAC 32 define whether the corresponding pixels will be displayed as light or dark pixels. In the preferred embodiment, only one bit of video data is used to define the state of each displayed pixel. Therefore only two distinct values are stored in the video DAC's internal table: all 128 table entries for $V7=1$ are given one value (e.g., representing a light pixel) and all table entries for $V7=0$ are given a different value (e.g., representing a dark pixel).

In the preferred embodiment, when the CPU 22 detects that the video subsystem is in monochrome mode, the color map in the video DAC 32 is automatically loaded with light and dark pixel values suitable for use with a monochrome monitor.

Mode Selection Signal.

The video memory module 30 includes a mode selection line 60 for carrying a mode selection signal. In the preferred embodiment, the mode selection signal has just two values: 1 for monochrome modules and monochrome mode, and 0 for color modules and color mode. The mode signal is carried by the mode selection line 60 to the video controller 36. Although not shown in the Figures, the mode selection line 60 is also read by the CPU 22 to determine what data should be stored in the video DAC 32.

For the 1 Meg pixel monitors used in the preferred embodiment, a color memory module 30 must contain eight megabits of video memory. Monochrome memory modules must contain 1 megabit of utilized video memory. Actually, in at least one preferred embodiment the monochrome memory module contains more memory space (e.g., two megabits) than is utilized because of the desire to present a consistent data path width (32 bit) to the CPU 22 for both color and monochrome video memory modules.

Video Controller.

Figure 3:
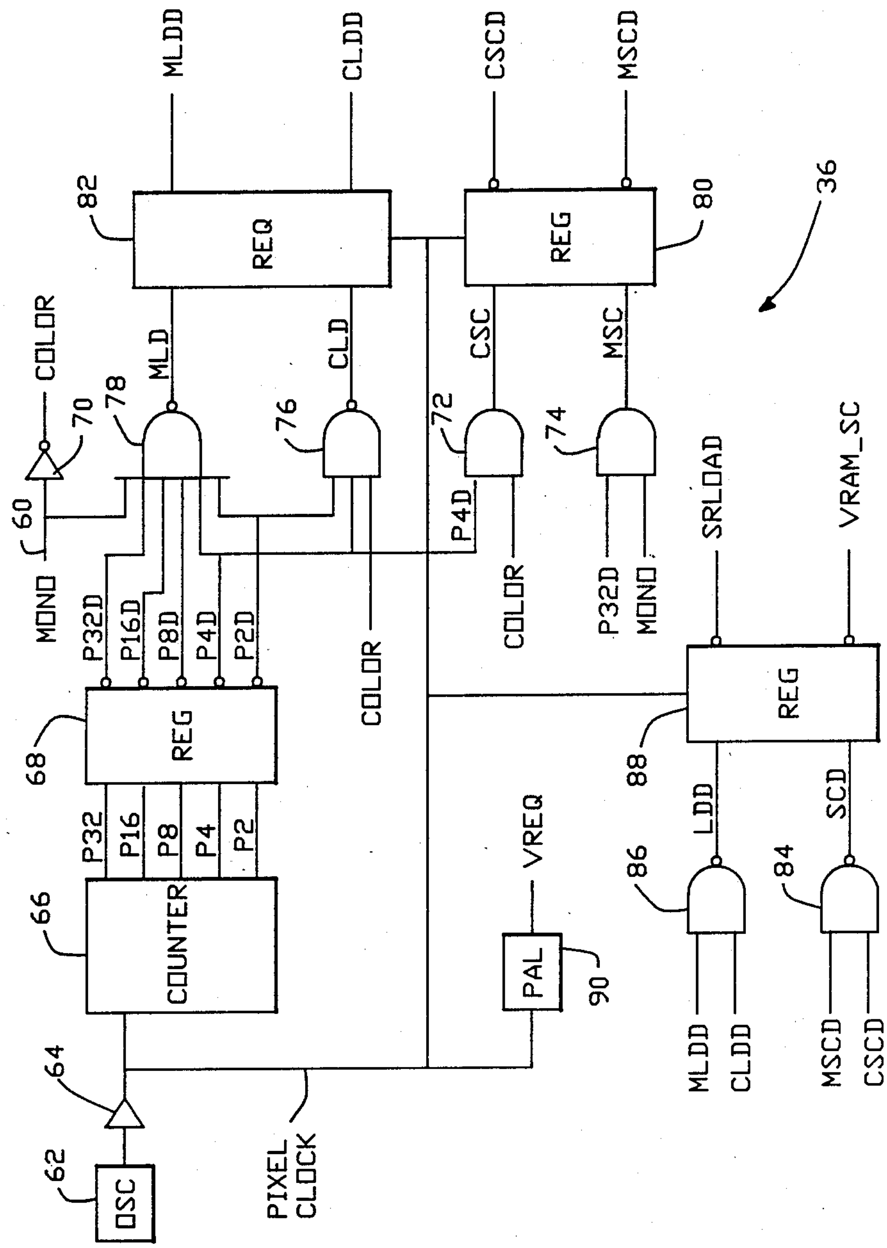
FIG. 3 is a circuit diagram of the memory controller in the preferred embodiment.

Referring to FIG. 3, the primary purpose of the video controller 36 is to generate two clock signals: VRAM_SC (Video Memory Shift Clock) and SRLOAD (Shift Register Load). These two clock signals control the rate at which data is transmitted from the video memory module 30 to the shift register 34, and thus the rate at which new video data is sent to the video DAC 32. Both of these clock signals are derived from the system's Pixel Clock which operates at the same fixed rate regardless of whether the system is in color mode or monochrome mode.

Since eight bits of video data are used to represent each color pixel in color applications while a single bit of video data is used to present each monochrome pixel in monochrome applications, video data must be supplied to the shift register 34 eight times faster in color mode than in monochrome mode.

An oscillator 62 and signal driver 64 generate the Pixel Clock signal. A counter 66, driven by the Pixel Clock, generates a set of slower derivative clock signals, P2, P4, P8, P16 and P32, which operate at rates of one half, one quarter, one eight, one sixteen and one thirty-second of the Pixel Clock rate. The counter 66 is operated as a down counter, generating a numerically smaller value with each Pixel Clock cycle.

The rate at which the shift register 34 in FIG. 1 is reloaded with new video data is herein called the Reload rate, and the period of time between reloads of the shift register 34 is herein called the Reload cycle. The derivative clock signals P2-P32 are used to determine to clock the video memory module's output port 38 to as to output new video data, and when to load that new video data into the shift register 34.

The derivative clock signals P2-P32 are buffered and stored by a register 68, which generates a set of delayed and inverted derivative clock signals P2D-P32D.

Figure 4:
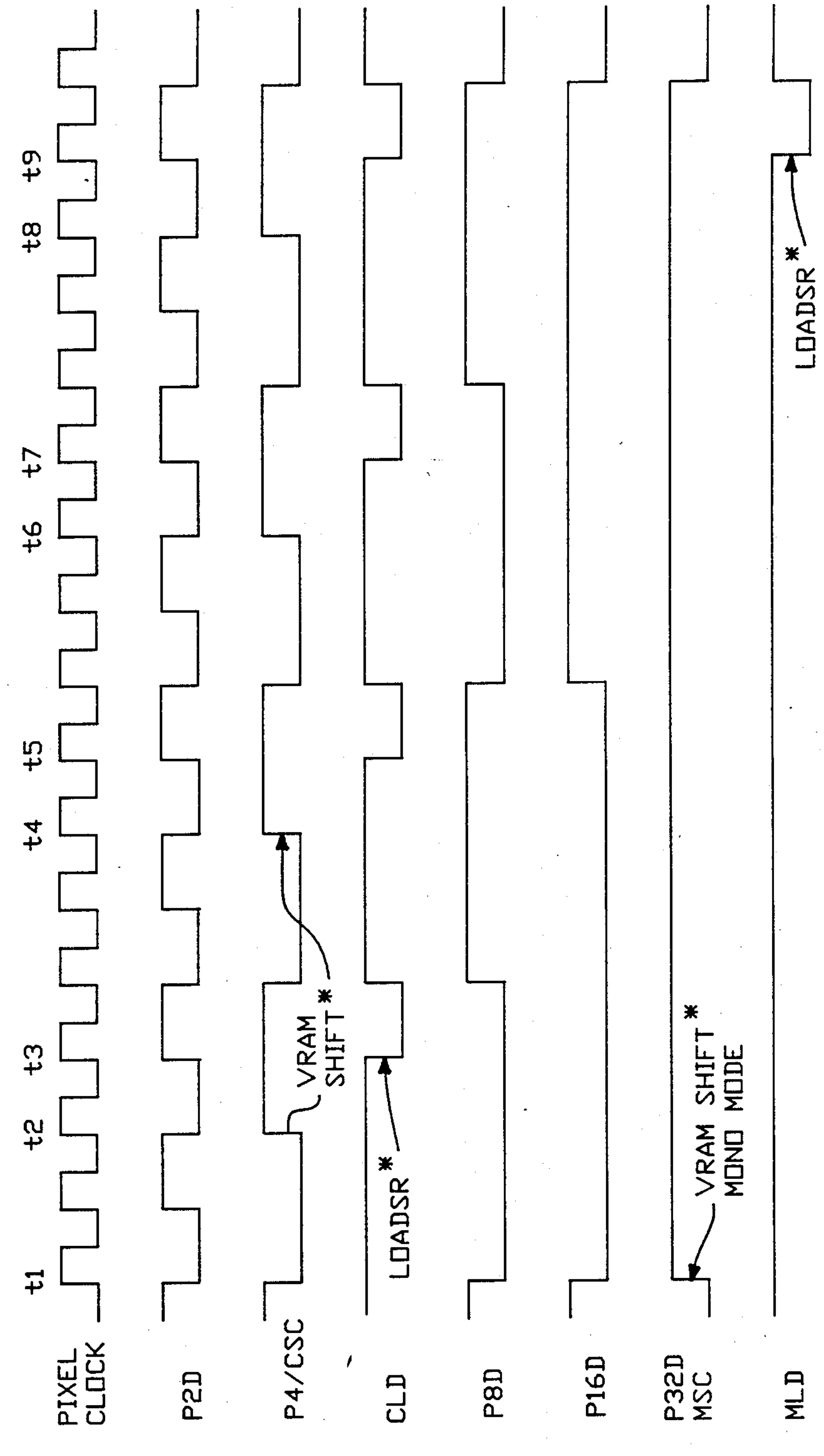
FIG. 4 is a timing diagram for the circuitry in FIG. 2.

FIG. 4 shows the Pixel Clock signal, the delayed derivative clock signals P2D-P32D, and the signals derived therefrom by the video controller 36.

An inverter 70 is used to invert the selection signal on mode selection line 60. For the purposes of this discussion, the selection signal is called the MONO signal because it is equal to 1 when the selection signal denotes that the video memory module 30 is a monochrome module. The output of the inverter 70 is herein called the COLOR signal because it is equal to 1 when the selection signal denotes a color memory module.

Two "memory shift clock signals" CSC and MSC are generated by AND gates 72 and 74. AND gate 72 ANDs the COLOR signal with the derivative clock signal P4D, thereby creating the CSC signal. CSC is a square wave clock signal which oscillates at a rate of one forth of the Pixel Clock rate when the video memory subsystem is in color mode, and is inactive when the subsystem is in monochrome mode.

AND gate 74 ANDs the MONO signal with the derivative clock signal P32D, thereby creating the MSC signal. MSC is a square wave clock signal which oscillates at a rate of one thirty-second of the Pixel Clock rate when the video memory subsystem is in monochrome mode, and is inactive when the subsystem is in color mode.

Two "shift register load signals" CLD and MLD are generated by NAND gates 76 and 78. NAND gate 76 combines the COLOR signal with the derivative clock signals P2D and P4D, thereby creating the CLD signal. CLD has a downward pulse, with a duration of one Pixel Clock cycle, once every four Pixel Clock cycles when the video memory subsystem is in color mode. CLD is inactive, and held high, when the subsystem is in monochrome mode.

NAND gate 78 combines the MONO signal with all the derivative clock signals P2D through P32D, thereby creating the MLD signal. MLD has a downward pulse, with a duration of one Pixel Clock cycle, once every thirty-two Pixel Clock cycles when the video memory subsystem is in monochrome mode. MLD is inactive, and held high, when the subsystem is in color mode.

Register 80 buffers, inverts and delays the CSC and MSC signals by one Pixel Clock cycle. The inverted and delayed CSC and MSC signals are labelled CSCD and MSCD, respectively. Register 82 buffers and delays the CLD and MLD signals by one Pixel Clock cycle. The delayed CLD and MLD signals are labelled CLDD and MLDD, respectively.

Combined shift clock SCD and load clock LDD signals are generated by NAND gates 84 and 86. Since the video memory subsystem is only in one mode, MONO or COLOR, at any one time, only one of the CSCD/CLDD and MSCD/MLDD pairs of signals will be active at any one time. The inactive signals are held high, making the NAND gates 84 and 86 act as inverters of the active signals. As a result, the SCS and LDD signals are simply inverted versions of the active shift clock (CSCD or MSCD) and load (CLDD or MLDD) signals.

Another way to view the operation of NAND gates 84 and 86 is as follows. Due to the fact that the inputs to the NAND gates are inverted or negative logic signals, these NAND gates operate as OR gates on the underlying logical signals. Thus SCD represents the OR of the SCS and MSC signals. Similarly, LDD represents the OR of monochrome and color load clock signals, i.e., the OR of inverter versions of the MLD and CLD signals.

Finally, Register 88 is used to buffer and invert the SCD and LDD signals, thereby generating the VRAM_SC shift clock and the SRLOAD shift register load clock. FIG. 4 shows the relationships between the VRAM_SC and SRLOAD clocks in both monochrome and color modes of operation.

The video controller 36 also includes other, conventional circuitry, such as a circuit 90 which generates a signal VREQ that instructs the memory management unit 40 (in FIG. 1) to load a new scan line of data into the video memory module's internal shift register. As is conventional, the circuit 90 counts Pixel Clock cycles and thereby determines when the monitor has reached the end of each scan line, at which time it generates a VREQ signal.

Upgrading from Monochrome to Color.

To upgrade a computer system, using the present invention, from a monochrome video system to a color video system, all that needs to be done is to replace the monochrome video memory module 30 with a color memory module, and the monochrome monitor 24 with a color monitor. The color memory module differs from the monochrome memory module in only two respects: the amount of memory in the module, and the polarity of the mode selection signal on the mode selection line 60. Thus the video subsystem 20 does not need to be replaced or changed when the computer system is upgraded from a monochrome to a color system.

It is noted that in the preferred embodiment, the video memory module 30 is implemented in the form of a SIMM (single in-line memory module) which plugs into a connector on the printed circuit board that houses the video subsystem 20. SIMMs are generally easy to remove and install (in part because they are very small PC boards, typically being about 5 inches long and two inches high), making it a very simple procedure to upgrade the video subsystem 20 from monochrome to color.

As will be understood by those skilled in the art, in other embodiments of the invention, a video memory module 30 could be upgraded from monochrome to color instead of replacing a monochrome memory module with a color one. This could be done by adding more memory to the module, and switching the value of the signal on the mode selection line 60. Such upgradeable memory modules would need a address signal decoder for selectively enabling memory chips in the module, and a switch for controlling the value of the signal on the mode selection line 60.

For monochrome video applications, the only additional expense required by the present invention over the expense of a traditional video subsystem is the cost of a more sophisticated video DAC 32 than required for monochrome applications. However, the cost of a video DAC is a small fraction of the cost of most monochrome to color video upgrades.

In summary, the presnnt invention provides a video memory subsystem which substantially lowers the cost of upgrading a monochrome video subsystem to a color video subsystem.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For example, the logical function of the video controller 36 could be implemented in many different ways. In another example of variations anticipated by the inventor, other implementations of the invention could use a different ratio of color bits per pixel to monochrome bits per pixel, such as a ratio of 1:1, 4:1, or 24:1.

What is claimed is:

1. A video memory system, comprising:

video memory module means for storing data representing a video image as an array of pixels, including means for generating a selection signal denoting whether said module is a monochrome memory module or a color memory module;

clock means for generating a clock signal at a predefined clock rate; and data transfer means coupled to said clock means and said video memory means for reading data from said video memory means and outputting data for one pixel of said selection signal denotes that said module is a monochrome memory module, and for reading data from said video memory means at a second predefined rate when said selection signal denotes that said module is a color memory module;

whereby said selection signal in said video memory module determines the mode of operation of said video memory system and the rate at which data is read from said video memory means.

2. The video memory system of claim 1, further including video signal generating means for converting data output by said data transfer means into a video signal, said video signal comprising a monochrome video signal when said selection signal denotes a monochrome memory module and comprising a color video signal when said selection signal denotes a color memory module.

3. The video memory system of claim 2, said data transfer means including:

load clock means coupled to said clock means and said video memory means for generating a load clock signal at said first predefined rate when said selection signal denotes that said module is a monochrome memory module, and for generating a load clock signal at said second predefined rate when said selection signal denotes that said module is a color memory module; said second predefined rate being an integer multiple of said first predefined rate; and shift register means coupled to said video memory module means and said load clock means for receiving and storing data from said video memory module means in response to said load clock signal, and coupled to said clock means for outputting in parallel a plurality of bits of said data at said predefined clock rate.

4. The video memory system of claim 3, wherein said video signal generating means includes means for storing a table of values corresponding to all the possible values of said parallel bits of data received from said shift register, said table of values storing a multiplicity of distinct values when said selection signal denotes that said module is a color memory module and storing only two distinct values when said selection signal denotes that said module is a monochrome memory module.

5. A video memory system, comprising:

video memory module means for storing data representing a video image, including means for generating a selection signal denoting whether said module is a monochrome memory module or a color memory module;

pixel clock means for generating a pixel clock signal at a predefined pixel clock rate;

load clock means coupled to said pixel clock means and said video memory means for generating a load clock signal at a first predefined rate when said selection signal denotes that said module is a monochrome memory module, and for generating a load clock signal at a second predefined rate when said selection signal denotes that said module is a color memory module; said second predefined rate being an integer multiple of said first predefined rate;

shift register means coupled to said video memory module means and said load clock means for receiving and storing data from said video memory module means in response to said load clock signal, and coupled to said pixel clock means for outputting in parallel a plurality of bits of said data at said pixel clock rate;

whereby said selection signal in said video memory module determines the mode of operation of said video memory system and the rate at which data is loaded from said video memory means into said shift register means.

6. The video memory system of claim 5, further including video signal generating means coupled to said shift register means for receiving said plurality of bits of data output in parallel by said shift register means and for generating a video signal corresponding to the value of said data; wherein said video signal generating means is responsive to only one of said parallel bits of data received from said shift register when said selection signal from said video memory module denotes that said module is a monochrome memory module.

7. The video memory system of claim 6, wherein said video signal generating means includes means for storing a table of values corresponding to all the possible values of said parallel bits of data received from said shift register, said table of values storing a multiplicity of distinct values when said selection signal denotes that said module is a color memory module and storing only two distinct values when said selection signal denotes that said module is a monochrome memory module.

8. The video memory system of claim 5, wherein said load clock means includes means for generating a memory shift signal prior to said load clock signal and at the same rate as said load clock signal;

said video memory module includes memory means having an video port shift register responsive to said memory shift signal, said video port shift register having an output coupled to said shift register means;

whereby data is sent from said video memory module means to said shift register means at a rate corresponding to the rate of said load clock signal.

9. A video memory system, comprising:

memory module means for storing video data, including means for generating a selection signal having a first predefined value when said module is a monochrome memory module and a second predefined value when said module is a color memory module;

pixel clock means for generating a pixel clock signal at a predefined pixel clock rate;

load clock means coupled to said pixel clock means and said memory module means for generating a load clock signal at a first predefined rate when said selection signal denotes that said module is a monochrome memory module, and for generating a load clock signal at a second predefined rate when said selection signal denotes that said module is a color memory module;

shift register means coupled to said video memory module means and said load clock means for receiving and storing data from said video memory module means in response to said load clock signal, and coupled to said pixel clock means for outputting in parallel a plurality of bits of said data at said pixel clock rate;

whereby said selection signal in said video memory module determines the rate at which data is loaded from said video memory means into said shift register means.

10. A method of operating a video memory system having a memory module and data stored therein representing a video image as an array of pixels, the steps of the method comprising:

generating a selection signal denoting whether the memory module is a monochrome memory module or a color memory module;

generating a clock signal at a predefined clock rate; and reading a portion of the data stored in the memory module and outputting data for one pixel of said stored video image during each cycle of said clock signal; said reading step reading the data stored in the memory module at a first predefined rate when said selection signal denotes that said video image is a monochrome image, and reading said stored data at a second predefined rate when said selection signal denotes that said module is a color memory module;

whereby said selection signal determines the mode of operation of said video memory system and the rate at which data is read from said memory module.

11. The method as set forth in claim 10, further including the step of converting said data being output into a video signal, said video signal comprising a monochrome video signal when said selection signal denotes a monochrome memory module and comprising a color video signal when said selection signal denotes a color memrry module.

12. The method as set forth in claim 11 wherein outputting step outputs in parallel a plurality of bits of said data at said predefined clock rate; and said converting step includes storing a table of video output signal values corresponding to all the possible values of said output parallel bits of data, said table of values storing a multiplicity of distinct color video signal values when said selection signal denotes that said module is a color memory module and storing only two distinct monochrome video signal values when said selection signal denotes that said module is a monochrome memory module.

13. The method as set forth in claim 11, said reading and outputting steps including the steps of:

generating a load clock signal at said first predefined rate when said selection signal denotes that said module is a monochrome memory module, and generating a load clock signal at said second predefined rate when said selection signal denotes that said module is a color memory module; said second predefined rate being an integer multiple of said first predefined rate;

providing shift register means coupled to said memory module;

receiving and storing data from said memory module in response to said load clock signal; and outputting in parallel a plurality of bits of said data at said predefined clock rate.

14. The method as set forth in claim 11, said reading and outputting steps including the steps of:

generating a load clock signal at said first predefined rate when said selection signal denotes that said module is a monochrome memory module, and generating a load clock signal at said second predefined rate when said selection signal denotes that said module is a color memory module;

providing shift register means coupled to said memory module;

receiving and storing data from said memory module in response to said load clock signal; and outputting in parallel a plurality of bits of said data at said predefined clock rate.

15. The method as set forth in claim 14, wherein said converting step includes storing a table of video output signal values corresponding to all the possible values of said parallel bits of data received from said shift register, said table of values storing a multiplicity of distinct color video signal values when said selection signal denotes that said module is a color memory module and storing only two distinct monochrome video signal values when said selection signal denotes that said module is a monochrome memory module.

16. The method as set forth in claim 15, said converting step including receiving said plurality of bits of data output in parallel by said shift register means and generating a video signal corresponding to the value of said data; wherein said step of generating a video signal is responsive to only one of said parallel bits of data received from said shift register when said selection signal denotes that said memory module is a monochrome memory module.

17. A method of operating a video memory system having a memory module and data stored therein representing a video image as an array of pixels, the steps of the method comprising:

generating a selection signal denoting whether the video image stored in the memory module is a monochrome image or a color image;

generating a clock signal at a predefined clock rate; and reading a portion of the data stored in the memory module and outputting data for one pixel of said stored video image during each cyce of said clock signal; said reading step reading the data stored in the memory module at a first predefined rate when said selection signal denotes that said video image is a monochrome image, and reading said stored data at a second predefined rate when said selection signal denotes that said video image is a color image;

whereby said selection signal determines the mode of operation of said video memory system and the rate at which data is read from said memory module.

18. The method as set forth in claim 17, further including the step of converting said data being output into a video signal, said video signal comprising a monochrome video signal when said selection signal denotes a monochrome video image and comprising a color video signal when said selection signal denotes a color video image.

19. The method as set forth in claim 18, wherein said outputting step outputs in parallel a plurality of bits of said data at said predefined clock rate; and said converting step includes storing a table of video output signal values corresponding to all the possible values of said output parallel bits of data, said table of values storing a multiplicity of distinct color video signal values when said selection signal denotes that said video image is a color image and storing only two distinct monochrome video signal values when said selection signal denotes that said video image is a monochrome image.

20. The method as set forth in claim 11, said reading and outputting steps including the steps of:

generating a load clock signal at said first predefined rate when said selection signal denotes that said video image is a monochrome image, and generating a load clock signal at said second predefined rate when said selection signal denotes that said video image is a color image; said second predefined rate being an integer multiple of said first predefined rate;

providing shift register means coupled to said memory module;

receiving and storing data from said memory module in response to said load clock signal; and outputting in parallel a plurality of bits of said data at said predefined clock rate.

21. The method as set forth in claim 18, said reading and outputting steps including the steps of:

generating a load clock signal at said first predefined rate when said selection signal denotes that said video image is a monochrome image, and generating a load clock signal at said second predefined rate when said selection signal denotes that said video image is a color image;

providing shift register means coupled to said memory module;

receiving and storing data from said memory module in response to said load clock signal; and outputting in parallel a plurality of bits of said data at said predefined clock rate.

22. The method as set forth in claim 21, wherein said converting step includes storing a table of video output signal values corresponding to all the possible values of said parallel bits of data received from said shift register, said table of values storing a multiplicity of distinct color video signal values when said selection signal denotes that said video image is a color image and storing only two distinct monochrome video signal values when said selection signal denotes that said video image is a monochrome image.

23. The method as set forth in claim 22, said converting step including receiving said plurality of bits of data output in parallel by said shift register means and generating a video signal corresponding to the value of said data; wherein said step of generating a video signal is responsive to only one of said parallel bits of data received from said shift register when said selection signal denotes that said video image is a monochrome image.

* * * * *

UNITED STATES PATENT AND TRADEMARK OFFICE

CERTIFICATE OF CORRECTION

PATENT NO. : 4,906,985
DATED : March 6, 1990
INVENTOR(S) : Thomas Furlong

It is certified that error appears in the above-identified patent and that said Letters Patent is hereby corrected as shown below:

<u>Column 7,</u>
Line 43, delete "presnnt" and insert therefor -- present --

<u>Column 10,</u>
Line 30, delete "memrry" and insert therefor -- memory --

<u>Column 11,</u>
Line 36, delete "cyce" and insert therefor -- cycle --

Signed and Sealed this

Ninth Day of August, 2005

JON W. DUDAS
*Director of the United States Patent and Trademark Office*

UNITED STATES PATENT AND TRADEMARK OFFICE

CERTIFICATE OF CORRECTION

PATENT NO. : 4,906,985
DATED : March 6, 1990
INVENTOR(S) : Furlong

It is certified that error appears in the above-identified patent and that said Letters Patent is hereby corrected as shown below:

<u>Column 8,</u>
Line 4, after "one pixel of" insert -- said stored video image during each cycle of said clock signal; said data transfer means reading data from said video memory means at a first predefined rate when --.

Signed and Sealed this

First Day of November, 2005

JON W. DUDAS
*Director of the United States Patent and Trademark Office*